(12) United States Patent
Hong et al.

(10) Patent No.: US 10,076,964 B2
(45) Date of Patent: Sep. 18, 2018

(54) PRE-CHARGE SYSTEM AND METHOD

(71) Applicant: Faraday & Future Inc., Gardena, CA (US)

(72) Inventors: Michael Hong, Gardena, CA (US); Long Huynh, Gardena, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 250 days.

(21) Appl. No.: 14/969,572

(22) Filed: Dec. 15, 2015

(65) Prior Publication Data

US 2017/0166065 A1    Jun. 15, 2017

(51) Int. Cl.
*B60L 11/18* (2006.01)
*B60L 11/08* (2006.01)

(52) U.S. Cl.
CPC .............. *B60L 11/18* (2013.01); *B60L 11/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,595,597 B2 * | 9/2009 | King | ................... | B60K 6/28 318/106 |
| 8,890,488 B2 * | 11/2014 | Fukui | ................... | B60L 3/003 320/163 |
| 9,573,474 B2 * | 2/2017 | Mensah-Brown | .... | B60L 11/005 |
| 9,783,078 B2 * | 10/2017 | Huynh | ................... | H02P 3/14 |

* cited by examiner

*Primary Examiner* — An Luu
(74) *Attorney, Agent, or Firm* — Skyler R. Lund

(57) ABSTRACT

A system is disclosed for connecting a battery string to a direct-current (DC) bus of a vehicle. The system may include a pre-charge circuit coupled between the battery string and the DC bus. The pre-charge circuit may include a first transistor. The system may also include a first contactor connected to the pre-charge circuit in series. The system may further include a controller configured to close the first contactor and switch on the first transistor.

17 Claims, 4 Drawing Sheets

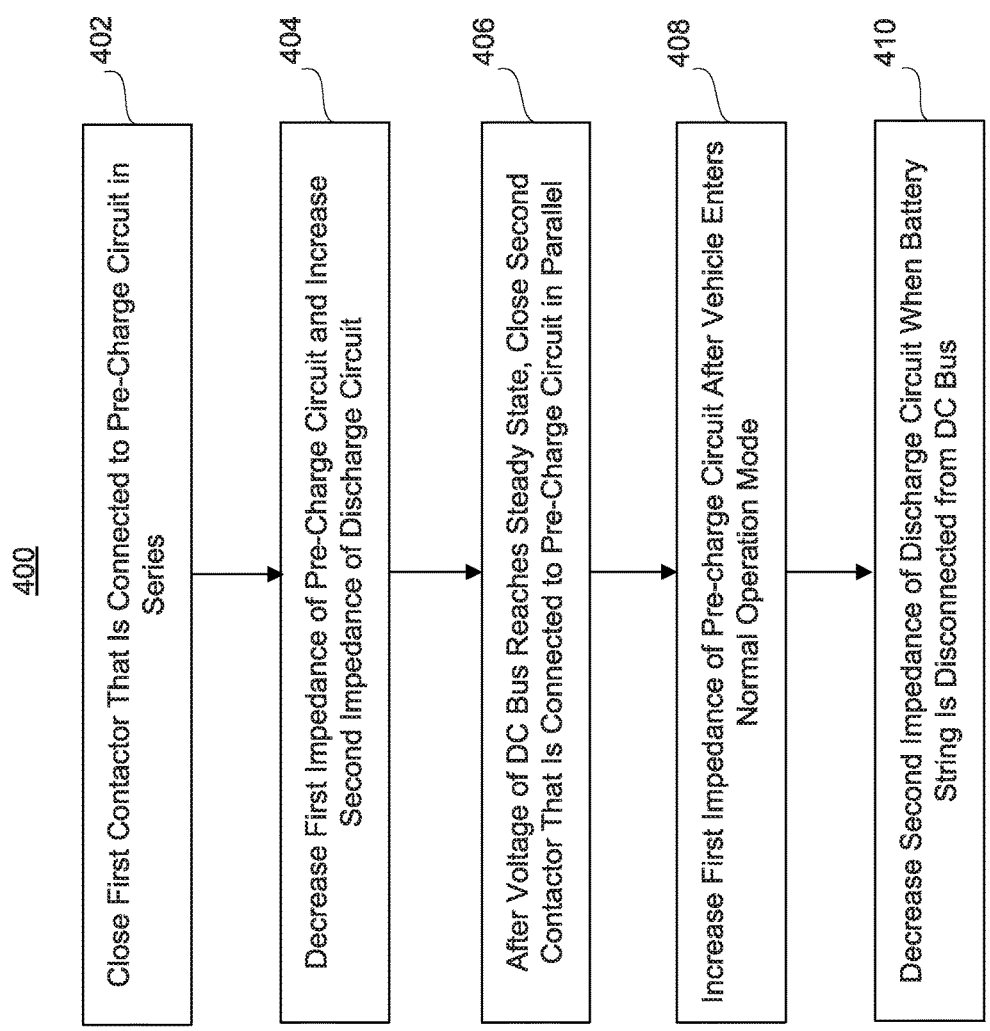

PRE-CHARGE SYSTEM AND METHOD

TECHNICAL FIELD

The present disclosure relates generally to a pre-charge system and method, and more particularly, to a pre-charge system and method for connecting a battery string to a direct-current (DC) bus of a vehicle.

BACKGROUND

Battery-powered vehicles, such as electric vehicles or hybrid electric vehicles, may contain one or more high-voltage battery packs connected to a DC bus. The high-voltage battery pack may be used as the primary power source of a vehicle to drive various primary loads (e.g., traction motors) and various auxiliary loads (e.g., HVAC, lighting, pumps, etc.). To ensure high-voltage safety, the high-voltage battery pack must be isolated from the vehicle electrical system when the vehicle is turned off. Consequently, each time when the vehicle is turned on, the high-voltage battery pack needs to be connected to the DC bus. However, because the loads may have a large capacitance and the high-voltage battery pack may only have a small source resistance, initial connection of the high-voltage battery pack may generate a severe inrush current. Such inrush current may easily peak up to, for example, 10,000 A in typical vehicle settings, and may damage electrical components of the vehicle.

To limit the inrush current, a pre-charge circuit may be coupled between the high-voltage battery pack and the DC bus to pre-charge the bus capacitance before the high-voltage battery pack is fully connected to the DC bus. Conventionally, the pre-charge circuit may include a pre-charge resistor and a pre-charge contactor (or relay) connected in series. During operation, the pre-charge contactor may be closed to connect the pre-charge resistor to the high-voltage battery pack, so as to limit the inrush current. However, the high power pre-charge contactor is an expensive and bulky component. It not only increases the cost of the vehicle, but also is difficult to package in the limited space of the vehicle.

The disclosed system is directed to overcoming one or more of the problems set forth above and/or other problems of the prior art.

SUMMARY

Consistent with one disclosed embodiment of the present disclosure, a system is provided for connecting a battery string to a direct-current (DC) bus of a vehicle. The system may include a pre-charge circuit coupled between the battery string and the DC bus. The pre-charge circuit may include a first transistor. The system may also include a first contactor connected to the pre-charge circuit in series. The system may further include a controller configured to close the first contactor and switch on the first transistor.

Consistent with another disclosed embodiment of the present disclosure, a system is provided for connecting a battery string to a DC bus of a vehicle. The system may include a pre-charge circuit coupled between the battery string and the DC bus. The system may also include a discharge circuit connected to the DC bus. The system may further include a controller configured to decrease a first impedance of the pre-charge circuit and increase a second impedance of the discharge circuit.

Consistent with yet another disclosed embodiment of the present disclosure, a method is provided for connecting a battery string to a DC bus of a vehicle. The method may include closing, by a controller, a first contactor coupled between the battery string and the DC bus. The method may also include switching on, by the controller, a first transistor connected to the first contactor and the battery string in series.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 4 is a flowchart of a method of performed by the system shown in FIG. 3.

DETAILED DESCRIPTION

For discussion purposes, the principles of the present disclosure are described in connection with the exemplary vehicle depicted in FIG. 1. Those skilled in the art will recognize that the principles of the present disclosure may be applied in any types of vehicle or machine to connect a battery to a DC bus.

Figure 1:
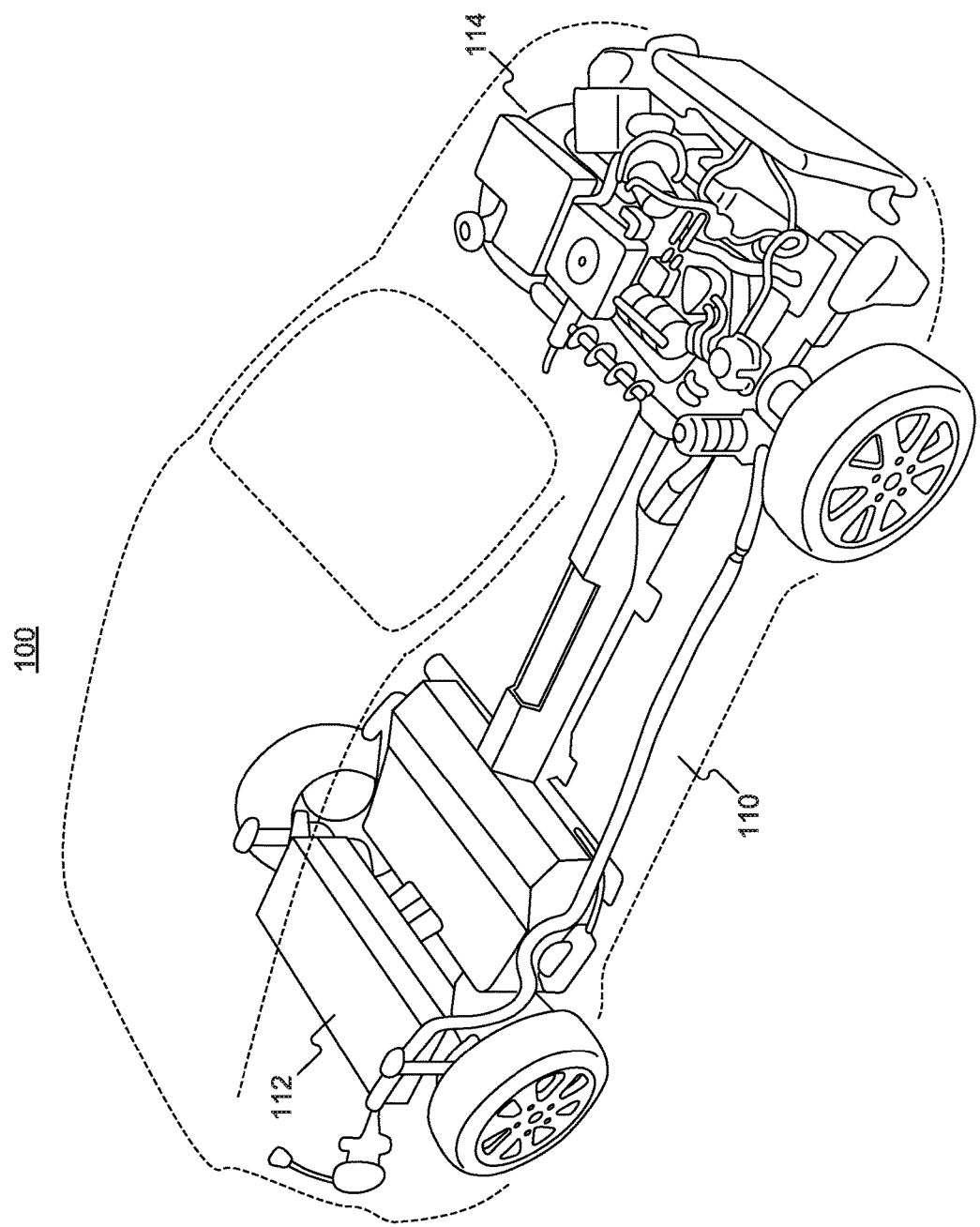
FIG. 1 is a schematic illustration of an exemplary vehicle including a system for connecting a battery string to a DC bus of the vehicle.

FIG. 1 is a schematic diagram illustrating a partial view of an exemplary vehicle 100. FIG. 1 will be described using an electric vehicle as an exemplary embodiment of vehicle 100, but vehicle 100 may be other types of vehicles. For example, vehicle 100 may be a vehicle at least partially powered by electrical power, such as an electric vehicle, or a hybrid vehicle. Vehicle 100 may have any body style, such as a sedan, a coupe, a sports car, a truck, a station wagon, an SUV, a minivan, or a conversion van. Referring to FIG. 1, vehicle 100 may include a power train 110 (illustrated by the solid lines in FIG. 1), which may further include one or more high-voltage battery packs 112 and an electric drive system 114 connected to a common DC bus.

Although FIG. 1 shows battery packs 112 located in the chassis and toward the rear of vehicle 100, battery packs 112 may be located in any other compartment of vehicle 100 such as, for example, within the hood area, or distributed evenly in the chassis. Battery packs 112 may include one or more high-voltage battery strings connected in parallel. Each battery string may further include multiple battery cells connected in series or in parallel. Each battery string may supply high-voltage DC, e.g., 400V, to electric drive system 114. Vehicle 100 may use multiple battery strings connected in parallel to improve system reliability and power availability. The parallel configuration of the battery strings may help to ensure that the connection or disconnection of one battery string with a DC bus of vehicle 100 does not significantly affect the operation of other battery strings. Thus, each battery string may operate independently of the others, facilitating continued vehicle operation notwithstanding a failure of one or more of the other battery strings.

Battery packs 112 may be associated with a battery management system (BMS, not shown) for managing the usage and charging of the battery strings in a safe and reliable manner. Specifically, the BMS may constantly monitor the battery state of charge (SOC) and state of health (SOH). For example, the BMS may monitor the output voltage of each battery string, voltages of individual cells in the battery string, current in and/or out of the battery string, etc.

Electric drive system 114 may include various loads and control units, such as an electric motor with power electronics (e.g., an inverter system) and cooling system, a transmission including the differential gear, a brake system, a high-voltage air conditioning for vehicle interior climate control, and the like. For example, when vehicle 100 is accelerating or maintaining a constant speed, the inverter system may convert the DC supplied by battery packs 112 into an alternating current (AC) for driving the electric motors. However, when vehicle 100 is operating in a regenerative-braking mode, the electric motor may operate as a generator that outputs AC, which is converted by the inverter system into DC for charging battery pack 112 and/or driving other loads of power train 110.

Electric drive system 114 may include numerous load capacitors serving various purposes. For example, the inverter system may use filter capacitors to remove undesirable frequencies. As another example, large integrated capacitors may be provided in vehicle 100 to power one or more loads. Therefore, electric drive system 114 may have a large input capacitance. To prevent severe inrush current upon initial connection of battery packs 112 to electric drive system 114, each battery string may use a corresponding pre-charge circuit to pre-charge the load capacitors.

Vehicle 100 may use high power contactors or relays (not shown) to switch high voltages. A contactor may include a coil associated with an armature, a moving contact mechanically coupled to the armature, and a fixed contact. When a controller associated with the contactor directs current to the coil, a resulting magnetic field generated in the coil may attract the armature. Since the moving contact is mechanically coupled to the armature, the contactor may use the attraction to couple the moving contact with the fixed contact. The coupling of the two contacts may allow electrical current to flow from a battery string to a load. When the controller stops supplying current to the coil, the magnetic field discontinues and the moving contact is returned to its relaxed state by a force such as, for example, a spring or gravity. Consequently, the electrical connection between the battery string and the load is interrupted, preventing current flow from the battery string to the load. In other implementations of so-called "latching" contactors or relays, the contactor may contain multiple armatures and have two mechanically stable states, one where the contacts are connected and the other where the contacts are not. Energizing particular armatures may cause the contactor to transition from one state to another.

Vehicle 100 may use numerous contactors in different locations to switch high voltages. For example, each battery string in vehicle 100 may have two main contactors, one connected the positive terminal and the other connected the negative terminal of the battery string. Each battery string may also have a pre-charge contactor to connect or disconnect the corresponding pre-charge circuit. However, the contactors such as mechanical relays contain moving parts and are bulky components. These contactors may be difficult to package in the limited space of vehicle 100, and leave little room for other parts and components. As described below, in exemplary embodiments consistent with the present disclosure, vehicle 100 may employ a pre-charge system that uses power transistors to switch high voltages. The compact size of the transistors offers more flexibility in packaging.

Figure 2:
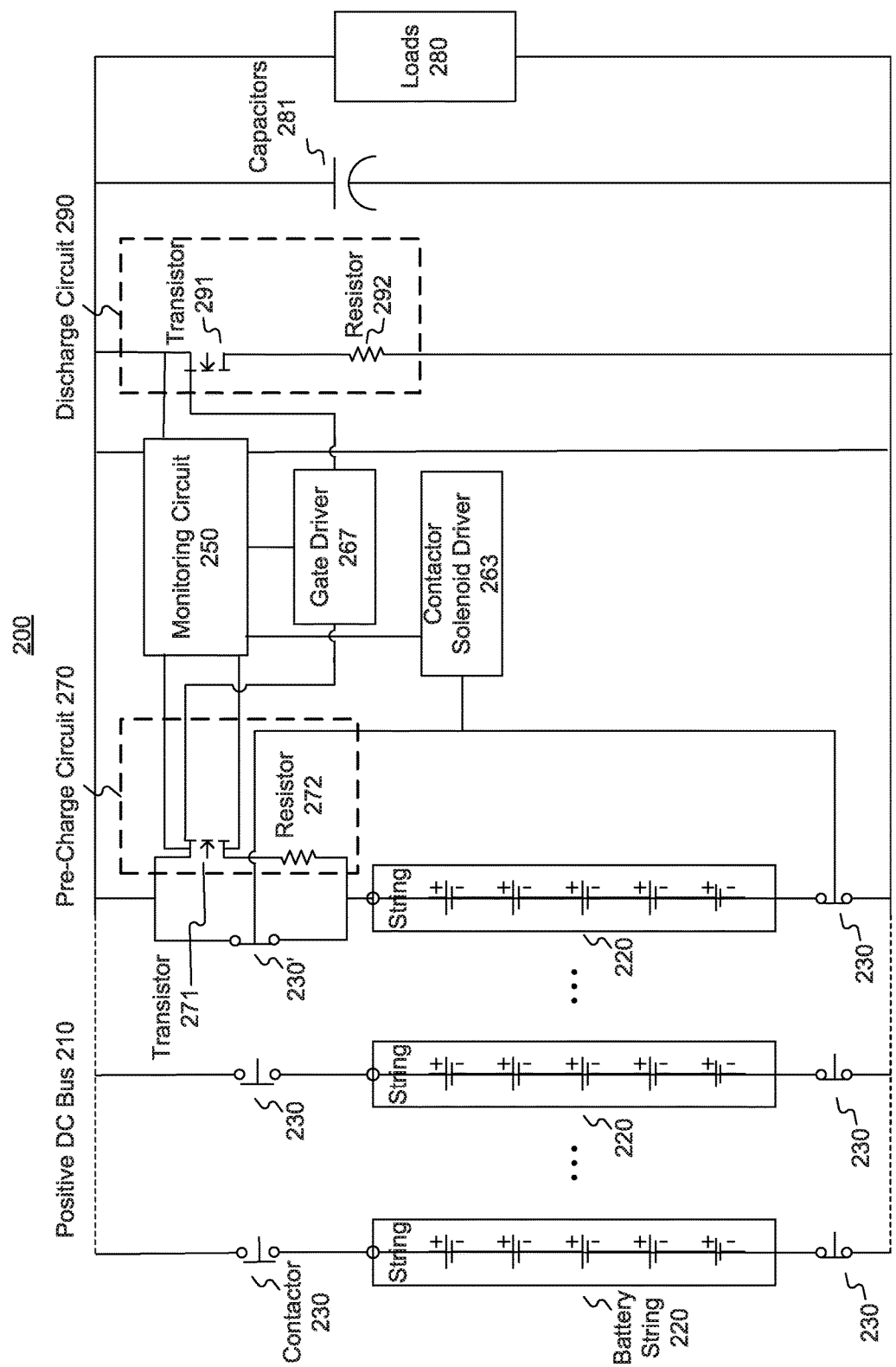
FIG. 2 is a schematic diagram illustrating an exemplary circuit used in the vehicle illustrated in FIG. 1, according to an exemplary embodiment.

FIG. 2 is a schematic diagram of an exemplary circuit 200 for connecting a string to a DC bus, according to an exemplary embodiment. For example, circuit 200 may be used in vehicle 100 illustrated in FIG. 1. Referring to FIG. 2, circuit 200 may include a DC bus 210, one or more high-voltage battery strings 220, a plurality of contactors 230, monitoring circuitry 250, a contactor solenoid driver 263, one or more gate drivers 267, one or more pre-charge circuits 270, various loads 280, load capacitors 281, and a discharge circuit 290.

DC bus 210 may include positive and negative power lines that electrically connect various components of a power train of vehicle 100, such as high-voltage battery strings 220, loads 280, and load capacitors 281, which may be similar to the above-described high-voltage battery packs 112 and electric drive system 114.

Each high-voltage battery string 220 may be equipped with switching devices, such as contactors 230, to connect and/or disconnect battery string 220 with DC bus 210 under different conditions. For example, if an operator of vehicle 100 turns on the vehicle, this closes contactors 230, i.e., connects battery strings 220 to DC bus 210, and activates other operation systems. Also, for example, if vehicle 100 contains multiple battery strings 220, vehicle 100 may only need to run on some of the battery strings 220. However, when more power is needed, vehicle 100 may connect additional battery strings 220 to DC bus 210 by closing the respective contactors 230.

Each high-voltage battery string 220 may be paired with two contactors 230, including a first contactor 230 configured to connect (contactor closed) or disconnect (contactor open) a positive terminal of battery string 220, and a second contactor 230 configured to connect or disconnect a negative terminal of battery string 220. As such, battery string 220 may be completely separated from the vehicle electric system when both contactors 230 are opened.

Each contactor 230 may be a high power contactor including a movable contact and a fixed contact. The movable contact may be mechanically coupled to an armature associated with a coil. The coil may be further connected to contactor solenoid driver 263. When contactor solenoid driver 263 energizes the coil, a magnetic field may be induced in the coil. The magnetic field may interact with the metallic material in the armature and causes movement of the armature and the movable contact. Thus, contactor solenoid driver 263 may control the closing and opening of contactor 230. Although FIG. 2 shows a contactor solenoid driver 263 connected with a pair of contactors 230, other contactors 230 may be connected to and controlled by the same or different contactor solenoid driver 263.

Although FIG. 2 only shows one pre-charge circuit 270, each battery string 220 may be connected with its own pre-charge circuit 270. Moreover, pre-charge circuit 270 may be placed at the positive terminal or the negative terminal of battery string 220. Each pre-charge circuit 270 may be connected to a first contactor 230 in series, and to a second contactor 230' in parallel. In exemplary embodiments, pre-charge circuit 270 may include a pre-charge transistor 271 and a pre-charge resistor 272.

Pre-charge transistor 271 may be a high power transistor, such as a metal-oxide-semiconductor field-effect transistor (MOSFET), or an insulated gate bipolar transistor (IGBT). Each pre-charge transistor 271 is connected to gate driver 267 that can switch on and off pre-charge transistor 271, and/or control pre-charge transistor 271 in the linear region. Although FIG. 2 shows the connection between one pre-charge transistor 271 and gate driver 267, other pre-charge transistors 271 may be connected to and controlled by the same or different gate driver 267. During normal operation of battery string 220 and/or when vehicle 100 is turned off, gate driver 267 may switch off pre-charge transistor 271 to prevent current from flowing through pre-charge circuit 270. However, during pre-charging of load capacitors 281, gate driver 267 may switch on pre-charge transistor 271 to allow inrush current flowing through pre-charge circuit 270.

Various considerations may be given to select proper pre-charge transistor 271 for use in circuit 200. Pre-charge transistor 271 may have a high current rating (i.e., $I_D$ of a MOSFET, and $I_C$ of an IGBT) to allow high inrush current to flow when transistor 271 is switched on and battery string 220 is pre-charging capacitors 281. Furthermore, pre-charge transistor 271 may also have a high voltage rating (i.e., $V_{DSS}$ of a MOSFET, and $V_{CES}$ of an IGBT) and be capable of blocking a voltage as high as the full bus voltage when transistor 271 is switched off. The current rating and voltage rating should leave a sufficient margin to account for voltage and current spikes, which are common in vehicle electric systems. In some embodiments, a plurality of transistors, either as discrete components or integrated together in a power module, can be used to switch high currents. For example, multiple MOSFETs may be connected in parallel to increase the current handling and efficiency.

When inrush current flows through pre-charge circuit 270, the presence of pre-charge resistor 272 may limit the level of the inrush current. The resistance of pre-charge resistor 272 may be chosen based on the total capacitance of capacitors 281 and the time for pre-charging capacitors 281.

Circuit 200 may also include monitoring circuitry 250 configured to detect the voltage of DC bus 210. Monitoring circuitry 250 may be connected to contactor solenoid driver 263 and gate driver 267. During pre-charging of load capacitors 281, after detecting that the voltage of DC bus 210 reaches a steady state, monitoring circuitry 250 may send signals to contactor solenoid driver 263 and gate driver 267 to close contactors 230 and switch off pre-charge transistor 271, respectively. In this exemplary manner, the pre-charge phase may be completed and battery string 220 may be fully connected to DC bus 210.

In some embodiments, to protect pre-charge transistor 271 from overvoltage, monitoring circuitry 250 may be further configured to detect the voltage across pre-charge transistor 271. When pre-charge transistor 271 is switched on and a large amount of inrush current flows through pre-charge transistor 271, a desaturation mechanism may be used to ensure that the maximum saturation limits of pre-charge transistor 271 is not reached. For example, if the voltage across pre-charge transistor 271 approaches or exceeds $V_{DS(sat)}$ of a MOSFET or $V_{BE(sat)}$ of an IGBT, monitoring circuitry 250 may trigger gate driver 267 to switch pre-charge transistor 271 off immediately or with a minimal delay, and/or trigger contactor solenoid driver 263 to open the first contactor 230 immediately or with a minimal delay.

Because pre-charge transistor 271 in its off state may produce a leakage current, circuit 200 may further include a discharge circuit 290 connected to DC bus 210 and configured to remove the leakage current after a battery string 220 is disconnected from DC bus 210. Discharge circuit 290 may include a discharge transistor 291 and a discharge resistor 292 connected in series. Discharge transistor 291 may be a power transistor similar to pre-charge transistor 271. Discharge transistor 291 may be connected to and controlled by gate driver 267. In exemplary embodiments, after vehicle 100 is turned off, gate driver 267 may switch on discharge transistor 291 to allow the leakage current to flow through discharge resistor 292 and dissipate as heat. In contrast, during normal operations of battery string 220 or when pre-charge transistor 271 is switched on, discharge transistor 291 may be switched off to prevent power loss. Monitoring circuitry 250 may be further configured to detect the leakage current flowing through discharge circuit 290. When the leakage current has reduced to approximately zero, monitoring circuitry 250 may send signals to gate driver 267 to switch off discharge transistor 291.

Figure 3:
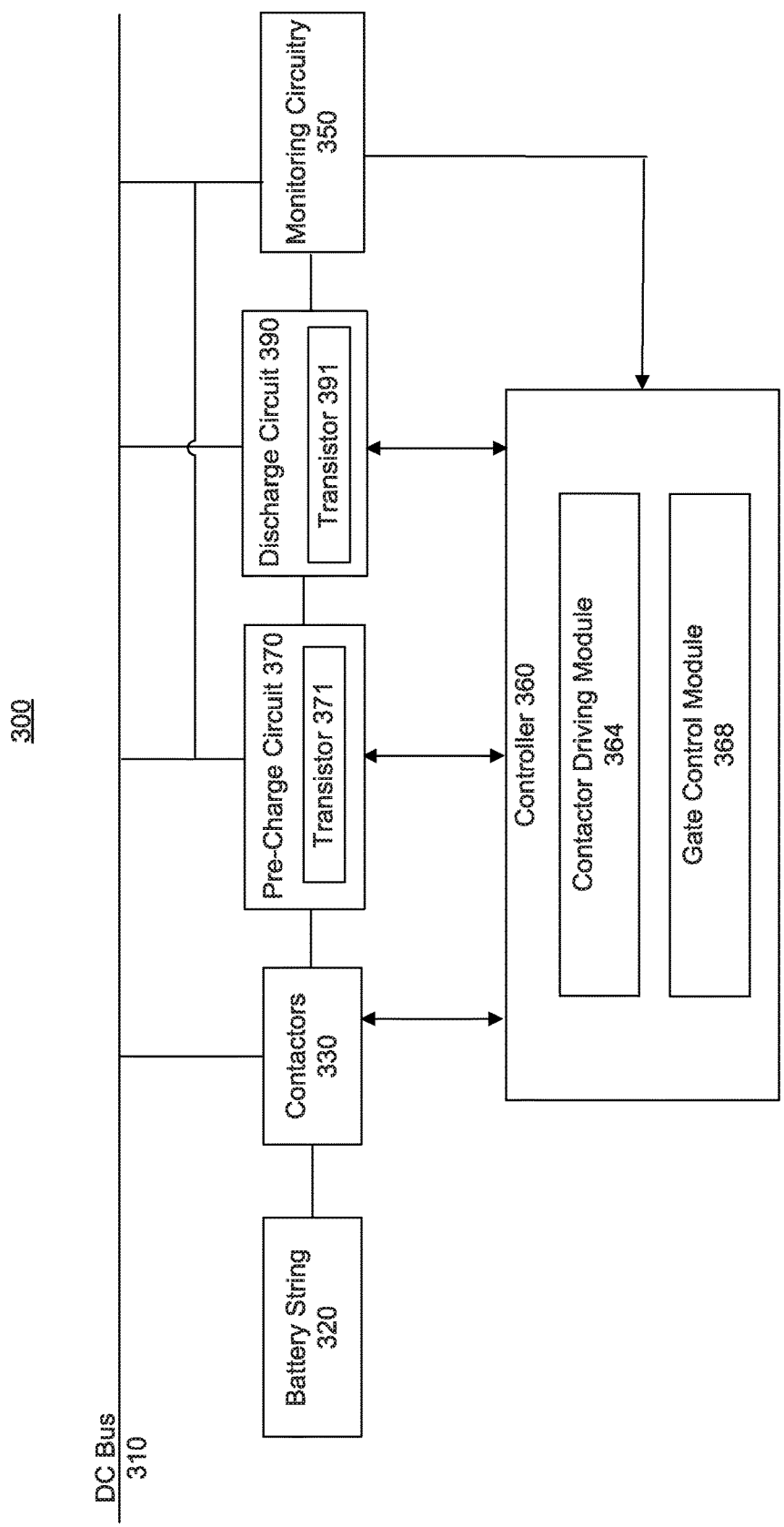
FIG. 3 is a block diagram of a system for connecting a battery string to a DC bus, consistent with the circuit illustrated in FIG. 2.

FIG. 3 is a block diagram of an exemplary system 300 for connecting a battery string to a DC bus 310, consistent with circuit 200 illustrated in FIG. 2. For example, system 300 may be used in vehicle 100 illustrated in FIG. 1. Referring to FIG. 3, system 300 may include one or more battery strings 320, contactors 330, monitoring circuitry 350, a controller 360, one or more pre-charge circuits 370, and a discharge circuit 390.

Consistent with FIG. 2, the structures and functions of DC bus 310, battery string 320, contactors 330, monitoring circuitry 350, pre-charge circuit 370, and discharge circuit 390 may be similar to the structures and functions of DC bus 210, battery string 220, contactors 230, monitoring circuitry 250, pre-charge circuit 270, and discharge circuit 290, respectively. In particular, pre-charge circuit 370 may include a pre-charge transistor 371 to control the flow of the inrush current, and discharge circuit 390 may include a discharge transistor 391 to control the flow of the leakage current produced by pre-charge transistor 371.

Controller 360 may take many forms, including, for example, a computer-based system, a microprocessor-based system, a microcontroller or microprocessor operatively coupled with a memory, an electronic control module (ECM), an electronic control unit (ECU), or any other suitable control circuit or system. Controller 360 may also include one or more of an application-specific integrated circuit (ASIC), a field-programmable gate array (FPGA), and a logic circuit configured to allow controller 360 to function in accordance with the disclosed embodiments. In some embodiments, controller 360 is specially configured with hardware and/or software modules for performing functions of system 300. For example, controller 360 may include a contactor driving module 364 and a gate control module 368. The modules may be implemented as specialized circuitry integrated within controller 360, and/or specialized software executable by controller 360. Functions of the modules are discussed in further detail with respect to FIG. 4.

In exemplary embodiments, controller 360 may include one or more of the following components (not shown): a memory, a processing component such as a microcontroller or microprocessor operatively coupled with the memory, a storage device, an input/output (I/O) interface, and a communication component.

The processing component may be configured to receive signals from other electronics onboard or offboard vehicle 100 and process the signals to determine one or more operation conditions of system 300. The processing component may be further configured to generate and transmit a control signal via, for example, the I/O interface, to connect battery string 320 to DC bus 310. In operation, the processing component may execute computer instructions stored in the memory and/or storage device.

The memory and the storage device may include any proper type of storage medium. The memory may include a non-transitory computer-readable storage medium including instructions for applications or methods executable by the processing component. The memory may also store data used for connecting a battery string 320, such as the output voltage of the battery string 320, the input capacitance of the loads, etc. For example, the non-transitory computer-readable storage medium may be a read-only memory (ROM), a random access memory (RAM), a flash memory, a memory chip (or integrated circuit), or the like. The storage device may include a volatile or non-volatile, magnetic, semiconductor, tape, optical, removable, nonremovable, or other type of storage device or computer-readable medium to provide additional storage space for controller 360.

The I/O interface may include one or more digital and/or analog communication devices that allow controller 360 to communicate with other systems and devices. For example, the I/O interface may receive signals from monitoring circuitry 350 that indicate the voltage of DC bus 310 has reached a steady state, and send the signals to the processing component for further processing. The I/O interface may also receive one or more control signals from the processing component, and send the control signals to contactors 330, pre-charge circuit 370, and/or discharge circuit 390 for connecting battery string 320 to DC bus 310.

The communication component may be configured to facilitate communication, wired or wirelessly, between controller 360 and other devices, including the BMS and/or a user interface. The communication component may access a wireless network based on one or more communication standards, such as WiFi, LTE, 2G, 3G, 4G, 5G, etc. In one exemplary embodiment, the communication component includes a near field communication (NFC) module to facilitate short-range communications between controller 360 and other devices. In other embodiments, the communication component may be implemented based on a radio frequency identification (RFID) technology, an infrared data association (IrDA) technology, an ultra-wideband (UWB) technology, Bluetooth (BT) technology, or other technologies.

FIG. 4 is a flowchart of an exemplary method 400 for connecting a battery string to a DC bus. For example, method 400 may be performed by system 300. Operation of exemplary system 300 will now be described in connection with FIG. 4.

In step 402, controller 360 may close a first contactor 330 that is connected to pre-charge circuit 370 in series. Vehicle 100 may include one or more battery strings. When vehicle 100 is turned on or needs additional battery strings to provide more power, controller 360 may initiate the operation to connect battery string 320 to DC bus 310. In some embodiments, controller 360 may be configured to determine whether pre-charge circuit 370 is required to connect battery string 320 to DC bus 310. For example, controller 360 may receive signals from the BMS and monitoring circuitry 350 that indicate the output voltage of battery string 320 and the current voltage of DC bus 310, respectively. Controller 360 may then compute the difference between the output voltage of battery string 320 and the current voltage of DC bus 310. If the difference exceeds a predetermined threshold, which means that a large inrush current may result, controller 360 may use pre-charge circuit 370 to pre-charge the load capacitors before fully connect battery string 320 to DC bus 310.

Before battery string 320 is connected to DC bus 310, both contactors 330 may stay open to isolate battery string 320 from the rest of vehicle 100. To connect pre-charge circuit 370, contactor driving module 364 may close the first contactor 330 that is connected to pre-charge circuit 370 in series, and leave open the second contactor 330' that is connected to pre-charge circuit 370 in parallel.

In step 404, controller 360 may decrease a first impedance of pre-charge circuit 370 and increase a second impedance of discharge circuit 390. Gate control module 368 may adjust the first impedance and second impedance by switching on or off pre-charge transistor 371 and discharge transistor 391, respectively. To start the pre-charge process, gate control module 368 may switch on pre-charge transistor 391 to allow the inrush current flow through pre-charge circuit 370. Resistors included in pre-charge circuit 370 may limit the inrush current to a desirable level. In some exemplary embodiments, gate control module 368 may also control pre-charge transistor 371 in the linear region to further increase and/or decrease the first impedance, so as to adjust the pre-charge time and control the inrush current level.

Gate control module 368 may also increase the second impedance by switching off discharge transistor 391. The increased second impedance may prevent the inrush current from being dissipated by discharge circuit 390, so as to limit energy loss and shorten the pre-charge time.

In step 406, after the voltage of DC bus 310 reaches a steady state, controller 360 may close the second contactor 330' that is connected to pre-charge circuit 370 in parallel. During the pre-charge phase, monitoring circuitry 350 may constantly monitor the voltage of DC bus 310. After the voltage reaches a steady state, monitory circuitry 350 may send signals to contactor driving module 364 to trigger the closing of the second contactor 330' that is connected to the pre-charge circuit 370 in parallel. As a result, both contactors 330 are closed and battery string 320 is fully connected to DC bus 310. The closed second contactor 330 short-circuits pre-charge circuit 370.

In step 408, controller 360 may increase the first impedance of pre-charge circuit 370 after vehicle 100 enters a normal operation mode. After battery string 320 is fully connected to DC bus 310, vehicle 100 may enter the normal operation mode. To reduce energy loss in pre-charge circuit 370, gate control module 368 may switch off pre-charge transistor 371 to further prevent the current from flowing through pre-charge circuit 370. Meanwhile, gate control module 368 may maintain discharge transistor 391 in the off state or at a high impedance, to prevent current from flowing through discharge circuit 390.

In step 410, controller 360 may decrease the second impedance of discharge circuit 390 when battery string 320 is disconnected from DC bus 310. For example, battery string 320 needs to be disconnected from DC bus 310 to turn off vehicle 100. To do so, contactor driving module 364 may open both contactors 330 for battery string 320. Gate control module 368 may also maintain pre-charge transistor 371 in the off state or at a high impedance, to further isolate battery string 320 from DC bus 310. Meanwhile, gate control module 368 may switch on discharge transistor 391 to allow the leakage current produced by pre-charge transistor 371 to be dissipated. Similar to step 404, gate control module 368 may also control discharge transistor 391 temporarily in the linear region to increase and/or decrease the second impedance of discharge circuit 390 if the conditions require.

The above-disclosed system may provide several benefits. First, the silicon-based transistors have no moving parts and enable most components of the pre-charge circuit and discharge circuit to be integrated on a compact circuit board. This circuit board has a small size and is easy to be replaced. Therefore, the disclosed system offers more flexibility in packaging. Further, the transistors may be more cost effective than contactors because the transistors generally cost less, require less power, and operate significantly faster than contactors.

It will be apparent to those skilled in the art that various modifications and variations can be made to the disclosed systems and methods. Other embodiments will be apparent to those skilled in the art from consideration of the specification and practice of the present disclosure. It is intended that the specification and examples be considered as exemplary only, with a true scope being indicated by the following claims and their equivalents.

What is claimed is:

1. A system for connecting a battery string to a direct-current (DC) bus of a vehicle, comprising:
    a pre-charge circuit coupled between the battery string and the DC bus, the pre-charge circuit comprising a first transistor;
    a first contactor connected to the pre-charge circuit in series;
    a controller configured to: close the first contactor; and switch on the first transistor; and
    a second contactor connected to the pre-charge circuit in parallel;
    wherein the controller is further configured to close the second contactor after a voltage of the DC bus reaches a steady state.

2. The system of claim 1, wherein the pre-charge circuit further comprises a pre-charge resistor.

3. The system of claim 1, wherein the first transistor is a MOSFET or an IGBT.

4. The system of claim 1, further comprising: monitoring circuitry configured to detect the voltage of the DC bus.

5. The system of claim 1, wherein the controller is further configured to switch off the first transistor after closing the second contactor.

6. The system of claim 1, wherein: the first contactor is configured to connect or disconnect a first terminal of the battery string with the DC bus; and the second contactor is configured to connect or disconnect a second terminal of the battery string with the DC bus.

7. The system of claim 1, further comprising a discharge circuit connected to the DC bus, the discharge circuit including a discharge resistor.

8. The system of claim 7, wherein the discharge circuit further comprises a second transistor connected to the discharge resistor in series, and wherein the controller is further configured to switch on the second transistor when the battery string is disconnected from the DC bus.

9. The system of claim 8, wherein the controller is further configured to switch off the second transistor when the first transistor is switched on.

10. The system of claim 1, further comprising: monitoring circuitry configured to detect a voltage across the first transistor after the first transistor is switched on, wherein the controller is further configured to switch off the first transistor after the detected voltage reaches a threshold voltage level.

11. A system for connecting a battery string to a DC bus of a vehicle, comprising:
    a pre-charge circuit coupled between the battery string and the DC bus;
    a discharge circuit connected to the DC bus;
    a controller configured to: decrease a first impedance of the pre-charge circuit; and increase a second impedance of the discharge circuit; and
    a second transistor;
    wherein the controller is further configured to operate the second transistor to change the second impedance.

12. The system of claim 11, wherein the controller is further configured to:
    increase the first impedance after a voltage of the DC bus reaches a steady state.

13. The system of claim 11, wherein the controller is further configured to:
    decrease the second impedance when the battery string is disconnected from the DC bus.

14. The system of claim 11, wherein the pre-charge comprises a first transistor, and wherein the controller is further configured to operate the first transistor to change the first impedance.

15. A method for connecting a battery string to a DC bus of a vehicle, comprising:
    closing, by a controller, a first contactor coupled between the battery string and the DC bus;
    switching on, by the controller, a first transistor connected to the first contactor and the battery string in series; and
    closing, by the controller, a second contactor after a voltage of the DC bus reaches a steady state, the second contactor being connected to the first transistor in parallel.

16. The method of claim 15, further comprising: switching off, by the controller, the first transistor after the second contactor is closed.

17. The method of claim 15, further comprising: decreasing, by the controller, an impedance of a second transistor when the battery string is disconnected from the DC bus, the second transistor being connected to the DC bus and configured to discharge a leakage current of the first transistor.

* * * * *